No. 866,257. PATENTED SEPT. 17, 1907.
W. A. CASE.
PANORAMA CAMERA.
APPLICATION FILED SEPT. 7, 1905.
3 SHEETS—SHEET 2.
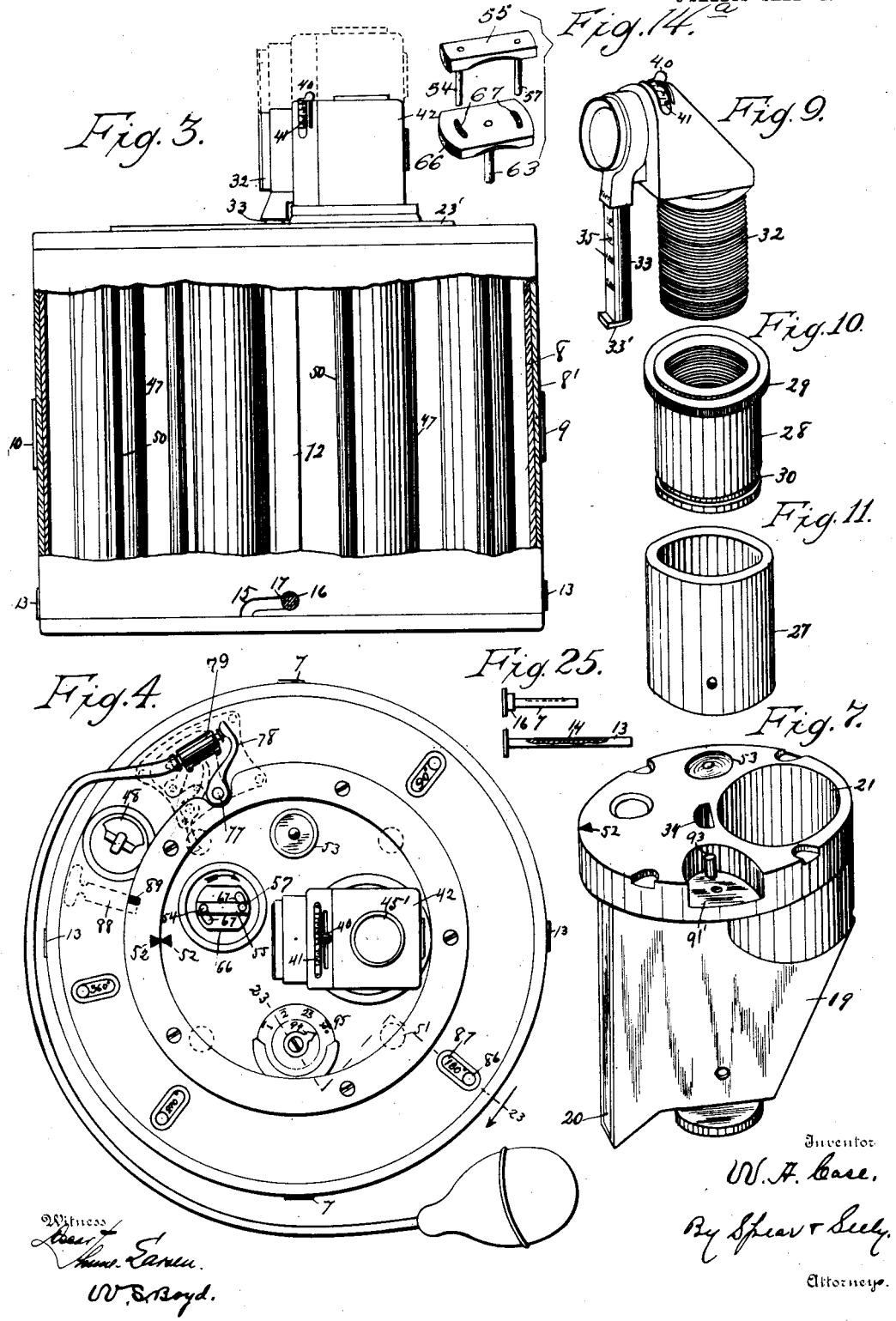

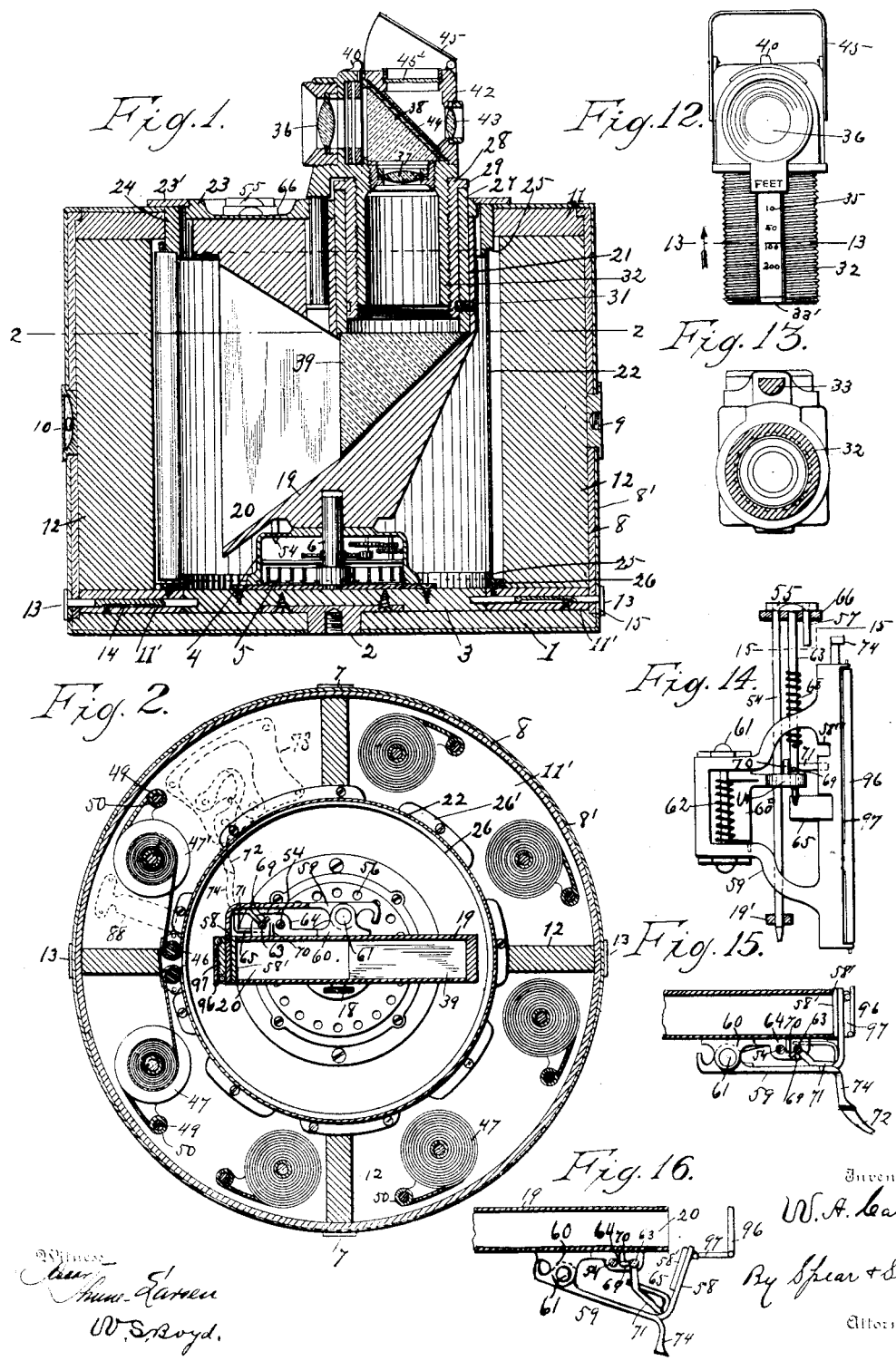

No. 866,257. PATENTED SEPT. 17, 1907.
W. A. CASE.
PANORAMA CAMERA.
APPLICATION FILED SEPT. 7, 1905.
3 SHEETS—SHEET 3.
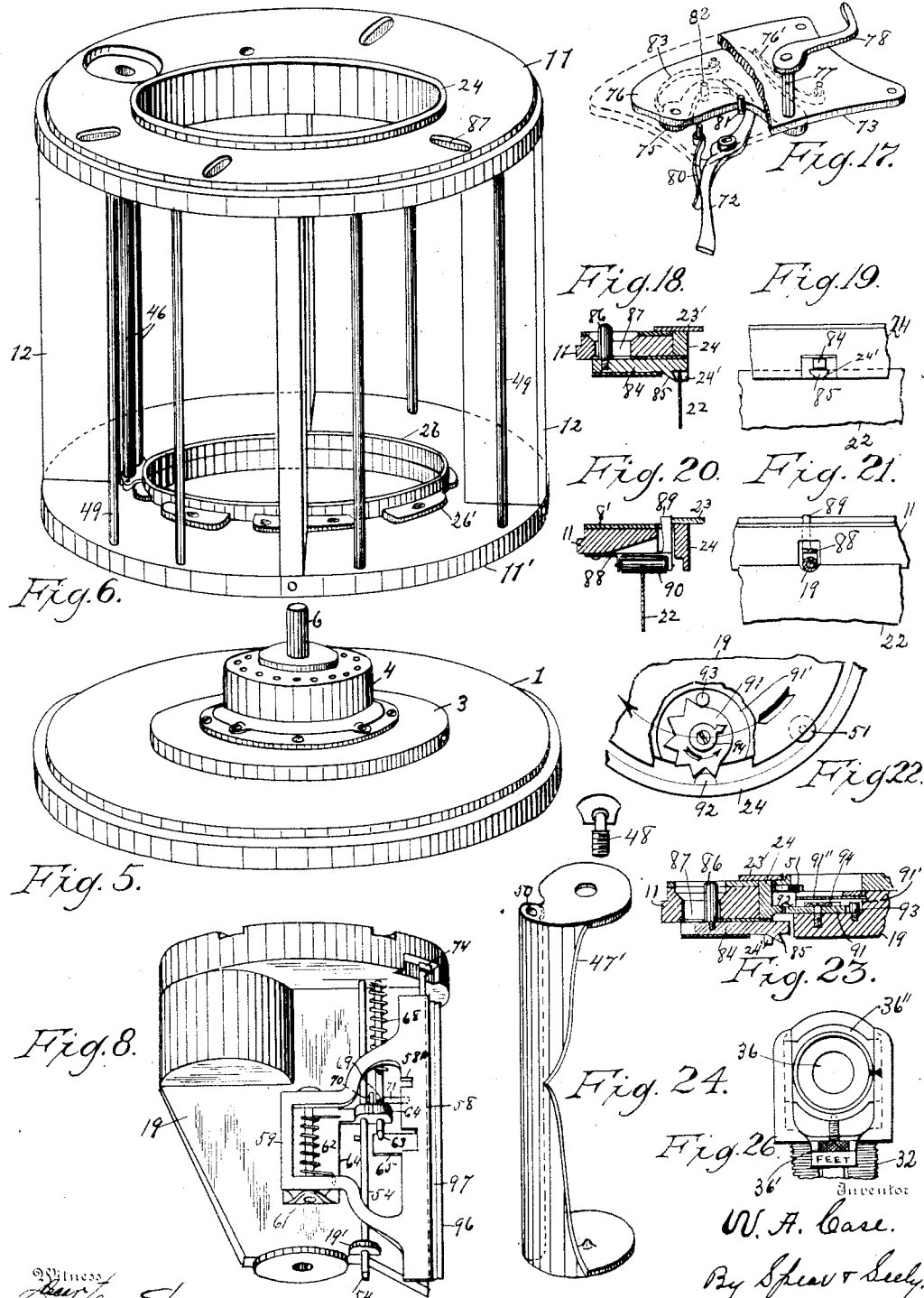

UNITED STATES PATENT OFFICE.

WILLIAM A. CASE, OF SAN FRANCISCO, CALIFORNIA.

PANORAMA-CAMERA.

No. 866,257.  Specification of Letters Patent.  Patented Sept. 17, 1907.

Application filed September 7, 1905. Serial No. 277,400.

*To all whom it may concern:*

Be it known that I, WILLIAM ARTHUR CASE, a citizen of the United States, residing at San Francisco, in the county of San Francisco and State of California, have invented certain new and useful Improvements in Panorama-Cameras, of which the following is a specification.

My invention relates to cameras and more particularly to that class of such instruments known as panorama cameras in which the exposure upon the film is made through what is known as a high speed focal plane shutter.

One of the objects of the invention is to produce a camera which shall be compact and simple yet be capable of producing pictures of variant sizes from a single object, as of an individual, to any portion or all of the whole horizon, or what I shall call a complete circle of a place or a landscape.

Another object is to vary the focal power of the lens to secure clear and distinct outlines and also to vary the time of exposure to suit the conditions under which the exposure is being made.

With these and other objects in view my invention consists in the improved construction and novel arrangement of parts of a camera as will be hereinafter more fully set forth.

In the accompanying drawings which illustrate the invention Figure 1 is a vertical central sectional view of a camera embodying my invention. Fig. 2 is a transverse sectional view of the same on the line 2—2 of Fig. 1, looking down, the tripping mechanism and film indicator being above said line and therefore shown in dotted lines. Fig. 3 is a broken side elevation, the lens holding mechanism being shown in dotted lines as elevated for varying the focus. Fig. 4 is a top plan view. Fig. 5 is a perspective view of the base. Fig. 6 is a similar view of the inner frame adapted to be detachably connected with the base. Figs. 7 and 8 are perspective views of the turret in two positions. Figs. 9, 10 and 11 are perspective views of the lens holder and the means for supporting it in the turret. Fig. 12 is a front elevation of the holder. Fig. 13 is a cross section of the same on the line 13—13 of Fig. 12. Fig. 14 is a side elevation of the shutter and part of its controlling mechanism. Fig. 14ª is a detailed view of the plates 55 and 56 slightly separated for the purposes of better illustrating them. Figs. 15 and 16 are sectional views of the same in two positions on the line 15—15 of Fig. 14. Fig. 17 is a broken perspective view of the tripping mechanism for releasing the shutter. Figs. 18 and 19 are detail views of the adjustable stop for the shutter. Figs. 20 and 21 are similar views of the film indicator. Fig. 22 is a broken plan of the time indicator. Fig. 23 is a broken sectional view of the same on the line 23—23 of Fig. 4, looking in the direction of the arrow and of some of the parts adjacent thereto. Fig. 24 is a perspective view of one of the film holders and the key for winding the film. Fig. 25 is a view of the pins for holding the parts of the camera together. Fig. 26 shows a means for adjusting the lens in the holder.

In constructing a camera in accordance with my invention a base 1, preferably circular, is provided which is adapted to be supported upon a tripod by the usual socket 2. Rigidly secured to the top of the base or formed integral therewith, is a block or frame 3, to the top of which is secured a case 4. Within the case is a train of gearing, the main spring 5 of which, is connected with a post 6 which projects through the top of the case and forms a support for the lens mechanism.

Detachably connected with the base, as by means of pins 7, is a shell or outer case 8, which is preferably formed from metal and provided with a socket 9 upon one side for supporting the camera in a horizontal position and with a spirit level 10 upon the opposite side. If desired a suitable covering 8' of leather or like material may surround the case 8 and add to its appearance and also act as a protector.

Fitting within the case 8 is an inner frame which is preferably formed from two annular disks or rings 11 and 11' and a plurality of posts or uprights 12, preferably four. The lower ring 11' fits around the frame 3 upon the base and is locked thereto by means of pins 13 which pass through the outer case 8 and are preferably arranged at right angles to the pins 7. Each of the pins 7 and 13 are provided with means for preventing its entire removal, as by providing it with a keyway as shown at 14 and its outer end is provided with a head for manipulating it. The case 8 is provided with open ended inclined slots 15 where the pins pass through to permit of a partial rotation of the case to remove or fasten it upon the base and the slots for the pins 7 are each enlarged at its inner end for the reception of an enlargement or collar 16 formed on or secured to each of the pins 7 adjacent to its head, which collars engage with shoulders 17 formed by the enlargement of the slots, and locks the case against reverse rotation until the pins 7 have been partially withdrawn. The pins 13 are longer than the pins 7 and enter suitable holes in the frame 3 with their inner ends and lock the inner frame against removal until the pins 13 have been partially withdrawn regardless of the position of pins 7.

Rigidly but removably secured to the pin or post 6 by a set screw 18 so as to rotate therewith with its upper end even with the top of ring 11, is a turret 19 formed from any suitable material, preferably metal and especially the lower part which is provided with a narrow opening in one side to form a diverging or fan shaped light shaft 20 which communicates with an opening 21 through the upper end of the turret. The lower portion of the turret is preferably flat and the top or upper portion is circular to fit within the ring 11. The light shaft 20 is so arranged as to cause a narrow bar of light to fall upon the film 22 from the top to the bottom and travel around upon the film as the turret is revolved and thereby form what is known as a focal plane shutter. A circular plate 23 is secured to the top of the turret and preferably has its edge recessed on top for the reception of an annular disk 23′ which virtually forms an extension of the plate and extends over the space between the top of the turret and an annular film guide 24 and prevents the entrance of light to the interior of the camera. The film guide is secured to the ring 11 in any desired manner and has one edge recessed as at 25 for the reception of the top edge of the film and a corresponding guide 26 is secured to the lower ring 11′ to engage with the lower edge of the film and cause it to stand in the form of a hollow cylinder and to retain that form as the film is moved endwise around the guides as it is being wound up after an exposure. The rings and guides form a film support and the guide 26 is secured in position by means of lips or projections 26′ which form a support for the lower edge of the film. Mounted in the opening 21 of the turret is a tube or socket 27 within which is rotatably mounted a swivel nut 28, the upper end of the nut being provided with a flange 29 which overhangs the tube 27 and by means of which the nut may be rotated by the fingers of the operator. The lower end of the nut is provided with means for holding it within the tube, as an annular groove 30 within which fits a pin 31 upon the interior of the tube and the tube is adapted to be held in the opening of the turret by frictional contact or by securing it in any desired manner as by the pin 31 which may project therethrough. A frame or hollow body 52 fits within the nut and forms a light well at one side of the axis of the turret through which the light is carried into the light shaft 20. The frame is adapted to be moved in or out by the screw threads on its shank when the nut is rotated for the purpose of varying the focus. A leg or extension 33 projects from one side of the top or head of the frame into a recess 34 in the top of the turret. One side of the leg, preferably the front, is provided with marks and figures 35 to indicate the position the leg should occupy to correspond with the number of feet the camera should be from the object, as 10, 50, 100, etc., to secure the proper focus. A stop 33′ is secured to the lower end of the leg 33 to prevent its removal after the parts have been assembled. Mounted in the frame 32 at right angles to each other are two lenses 36 and 37, the optical center of the outer one 36, which is also its mechanical center, being coincident with the extended axis or mechanical center of rotation of the turret. The other lens is situated between two reflectors, as prisms 38 and 39. The reflecting surfaces of the prisms are each set at an angle of 45 degrees to the ray of light falling thereon so that the light entering the lens 36 will be reflected by the prism 38 in a line parallel with the axis of the camera and pass through the lens 37 and be reflected by the prism 39 so as to fall upon the film 22 which surrounds the inner frame. Vertical adjustment of the lens 36 independent of the frame 32 may be secured by rotating a screw 36′ which moves a frame 36″ in which the lens 36 is mounted. By constructing the turret and arranging the lenses and reflectors in this manner, the light upon leaving the lens 37 passes in substantially parallel rays until it strikes the reflecting portion of the prism 39 whence it is reflected in diverging rays upon the film, thereby preventing the reflection of the rays by the walls of the opening through the shank or screw threaded portion of the frame 32, and causing them to make a clear and distinct image upon the film. If it be desired to take a picture of objects on a different horizon, as above or below the camera, the reflectors must be set at such angles as will reflect the rays of light therefrom so as to fall upon the film.

By arranging the film in the form of a cylinder with its axis coincident with the axis of the turret and also arranging the optical center of the outer lens coincident with said axis when extended and providing means for varying the distance between the two reflectors or prisms it is evident that the two lenses can be so adjusted relatively to the film as to secure the proper focus for producing a clear and distinct image of any desired object falling within the range of the camera. The amount of light to be admitted through the lens is controlled by any suitable means as the ordinary iris diaphragm which is operated by a knob 40, the top of the body 32 being provided with a series of numbers 41 to indicate the point at which the knob should stand to secure the desired result.

A view finder 42 may be arranged on top of the body 32 with its lens 43 located opposite to the lens 36 but having its axis coincident therewith to cause the image upon the reflector 44 to correspond with the picture that will be taken upon the film. If desired a suitable hood 45 may be provided to cover the opening 45′ in the view finder and make the image upon the reflector more distinct.

The film 22, which is preferably in the form of the ordinary cylindrical cartridge, is placed within a holder 47 in the inner frame at one side of two rollers 46 and is wound therefrom onto another holder 47′ at the other side of the rollers 46 after having been passed between said rollers and around in the recesses 25 of the rings or guides 24 and 26. The holder 47′ can be rotated in any suitable manner but preferably by the ordinary wing or handle 48. The roll holders each consists of a plate or central portion with its ends which are flexible, bent at right angles thereto, and engaging with the ends of the cartridge in the usual manner. A rod 49 passes through the top and bottom rings 11 and 11′ and through an ear 50 formed by bending one edge of the plate from end to end whereby the rod acts as a pivot on which the holder can be turned. In this manner the holders can be swung out beyond the edges of the rings to be loaded and swung back again to permit of the film being unwound and exposed. If desired additional holders may be arranged in the space in the frame between the rings 11 and 11′ for the reception of extra films, or the space may be utilized for other purposes. The two rollers 46 are arranged directly opposite the mouth of the light shaft so that any variation in the exposure resulting from the starting and stopping of the shutter will occur at the ends of the exposed portion of the film where it will be the least objectionable. The rotation of the turret is facilitated by a series of anti-friction wheels 51, journaled at the outer edge of the turret in position for engaging with the guide 24. Indicators 52 are preferably arranged on top of the turret and the ring 23 to indicate when the turret is standing at the normal position and ready to be operated. An ordinary leveling device 53 is also preferably located in the upper face of the turret to indicate when the camera is standing perfectly level or horizontal.

The turret is adapted to be rotated during exposure by the spring 5 in the case 4 but it may be locked against rotation by a pin 54 for using the finder or making non-rotative exposures. The upper end of the pin projects through the top of the turret and is formed into or provided with a recessed head or finger nut 55 and its lower end is adapted to pass through a projection 19′ on the side of the turret and enter any one of a series of perforations 56 in the top of the case 4. A pin 57, or extension from the head 55, is provided to give sufficient stability to the pin 54.

The shutter for closing the mouth of the light shaft and preventing the entrance of light to the interior of the camera except when making an exposure consists of a wing or flat plate 58, which is arranged at substantially right angles to the free end of an arm 59, the opposite end of said arm being pivotally mounted on a base plate 60 by means of a pin 61. The inner face of the plate or shutter is preferably provided with a pad 58′ of yielding material for engaging with the sides of the light shaft to assist in excluding the light. A spring 62 surrounds the pin 61 and engages with the arm 59 and normally holds the shutter open or away from in front of the light shaft, the arm being extended beyond the pivot and adapted to engage with the base and limit the outward movement of the plate. A pin 63 projects down through the turret and through a perforation in an extension 64 of the base plate and has its lower end preferably pointed and in position to engage with a projection 65 from the rear edge of the shutter and lock the shutter in its closed position. The upper end of the pin is provided with a head or finger nut 66 which is wider than the head 55 and has its sides recessed similar thereto for being grasped by the fingers and it lies under the head 55 and is provided with two slots 67 which will permit of a partial rotation of the head without its interfering with the pins 54 and 57. A coil spring 68 is secured at its lower end to the body of the pin 63 and engages with the under portion of the turret to normally hold the pin down or in its locking position. The lower end of the pin is preferably reduced where is passes through the extension 64 and it is further provided with a shoulder, as a short pin 69, which is adapted to engage with the top of a projection 70 from the extension 64 and lock the pin 63 against downward movement. Another short pin 71 projects from the pin 63 in position to pass through a slot 58″ in the rear edge of the shutter when the pin is raised and rotated to place the shoulder 69 on the projection 70, but which will be engaged by the edge of the notched portion of the shutter when the shoulder is at rest on the projection and thereby rotate the pin 63 sufficiently to throw the pin off the projection and thereby permit the spring 68 to force the lower end of the pin 63 down behind the projection 65 and lock the shutter after it has been closed at the end of the rotation of the turret in making an exposure.

The closing of the shutter is controlled by a stop lever 72 which is pivotally mounted on a plate 73 so that one end normally projects into the path of an arm 74 on the shutter and the other end is adapted to be engaged by a pawl 75 pivotally mounted on a plate 76 which is rigidly secured to the lower end of a post 77 which extends through the upper ring 11. The post is provided at its upper end with an arm 78 which is actuated by the plunger 79 in the usual manner. The pivot 77 is so arranged relative to the end of the lever 72 that after the pawl 75 moves the lever to release the arm 74 it passes beyond the end of the lever and permits the lever to be returned to its normal position by a spring 80 whether the pressure upon the bulb is released or not, and engage with the arm on the shutter and close the shutter when the turret completes its rotation or is returned to its normal position. The lever 72 is stopped upon its return movement by a pin 81 which also stops the plate 76 on its return movement. On the return movement of the plate 76 which can be effected by any suitable mechanism, as a spring 76′, the pawl rides over the end of the lever 72 and is forced back into its normal position against pin 82 by a spring 83.

As above described the camera is adapted for use in taking pictures including a full circle or 360 degrees but it is frequently desirable to take pictures of a less number of degrees and I have shown means for taking them of 90, 180 or 270 degrees, but similar means could be provided for taking them of any other desired number of degrees. As for instance with a film 4 inches wide the pictures may be 4x4, 4x8, 4x12 or 4x16, the length of the full circle exposure. A convenient form of mechanism for this purpose comprises a series reciprocatory blocks 84 mounted on the under side of the upper ring 11 with the inner end of each block provided with a cutter, as a shoulder or projection 85, preferably semi-cylindrical and under cut as shown, which is adapted to enter a hole or recess 24′ in the edge or flange of the guide 24 and cut out a small piece of the film which is between the shoulder and the flange and thus form a notch in its upper edge. Each block can be moved back and forth by means of a pin 86 which fits in a radial slot 87 and the top of each block can be provided with numbers to indicate the degrees or length of the picture that will be taken when it is pushed in. When a block is pushed in its inner end, except the one for 360 degrees or the full circle, will project into the path of the arm 74 and engage therewith and close the shutter and stop the further rotation of the turret. After a picture has been taken of any length or number of degrees less than a full circle, the block is withdrawn and the turret is returned to its normal position and the exposed film is wound upon the holder 47′ in the usual manner. In order to tell when enough of the film has been wound up to include the exposed portion an indicator is provided which consists of a frame or plate of thin metal 88 which is secured at one end to the under side of the upper ring 11 and has its free end bent up to form a pin or projection 89 which is adapted to normally have its upper end even with the top surface of the disk or ring 23. A roller 90 is journaled to the under side of the plate 88 in position to stand across the upper edge of the film between one of the rollers 46 and the holder 47′. When the full width of the film is under the roller the pin 89 will stand above the top of the disk but as soon as the notch that has been formed by the cutter 85 has reached that point the roller will drop into it and the pin will return to its normal position, or even with the disk, and indicate that the exposed film has all been wound up. Owing to the distance that the arm 74 projects to one side of the mouth of the light shaft there will always be a loss of film equal to said distance, between the rear edge of the exposed portion and the notch, except for the full circle, which will allow for cutting the film into individual pictures or sections.

As the turret is rotated by the spring 5 in making an exposure the time of exposure must therefore depend on the speed with which the spring unwinds. The spring is wound up to give any desired speed by rotating the turret by hand and holding the spring against unwinding by the engagement of the arm 74 on the shutter with the tripping lever 72 as heretofore explained. The rotation of the turret during exposure is rendered uniform by any suitable governor on the train of gearing, not shown, and an indicator is provided for showing the length of time of the exposure. The indicator consists of a spur wheel 91 which is journaled in a suitable recess 91' in the edge of the turret in position to engage with a pin or projection 92 upon the inner face of the guide ring 24 at every revolution of the turret, said projection being located between the horizontal plane of the cutters and the anti-friction wheels 51 so as to interfere therewith when the turret is rotated. A pointer 94 is connected with the wheel and is adapted to be moved from one figure to another of a series 95 on top of the turret, as for instance from 100 to 25 or 2 or 1, to indicate that if the pointer stands at 1 the exposure will be one second, but if at any of the other figures it will be the fraction of a second indicated by such figure.

One side of the wheel is smooth or cut away so as to form a shoulder at each end and a pin 93 is located in such a position relative to said shoulders that when the parts are assembled in the position shown in Fig. 22, the pin will engage with one of the shoulders with the pointer at the figure indicating the greatest rate of speed and will prevent the further rotation of the shutter by hand to increase the speed. At each revolution of the shutter in the direction of the longer arrow the wheel will be moved one step in the direction of the shorter arrow, and as soon as it has been rotated as many times as there are notches in the wheel, which in the present instance is four, the pointer will indicate the slowest speed and the pin will engage with the other shoulder and thereby lock the shutter against any further rotation or unwinding of the spring. As the spring is partially unwound by each exposure it is evident that the turret must be turned back after each exposure at the same rate of speed. A glass cover 91'' fits over the recess between the top of the turret and the plate 23 to protect the pointer from injury.

In setting the instrument for any desired speed the pin 54 must be drawn up until its lower end is released from the top of the casing 4 when the turret can be rotated by hand in the proper direction until the indicator stands at the number indicating the desired time. If the rotation is to be in the direction of making an exposure the stop lever 72 must be thrown back out of the way by operating the arm 78 as by compressing the bulb as for making an exposure, but when being turned in the other direction the projection 74 will push the end of the stop lever out of the way as the turret is being revolved.

When it is desired to take a picture of a single object, as of a person, where it is necessary to have as perfect a focus as possible, a wing or focal plate 96 is connected with the shutter, as by means of an arm or wing 97, and is adapted to be swung out into the plane of the film in front of the light shaft when the shutter is standing open and act as the ordinary ground glass plate. The hinges of these two parts are stiff enough to hold the wing in its folded position and prevent its accidentally flying out as the turret is being rotated in making an exposure. To manipulate the parts in this manner the outer casing 8 and the frame or film holder are removed by releasing them from the base and the wing unfolded as shown in Fig. 16. The nut 28 is then rotated by the flange 29 until the body 32 has been moved in or out sufficiently to secure the proper focus which can be determined by observing the face of the wing from a point to one side of the rear of the turret. The wing is then folded back upon the shutter and the shutter closed and the case and film holder returned to their proper positions and locked. The film for taking this kind of a picture is formed by securing short pieces of film upon a black, light proof strip at distances from one another equal to a full circle section of the film or the distance around the interior of the inner frame or film holder. The strip is placed around the guides of the frame with the sections of film wound upon the holder and the frame and casing replaced upon the base. The strip is then wound onto the other holder until the section of film reaches the desired point which can be known by the indicator dropping into a notch on the strip that has been prepared for that purpose. After the exposure the strip is further wound up until the film is protected which is also indicated by the indicator.

In using the camera for ordinary work the shutter is locked and the inner frame removed and the film placed in position around the guides and the frame after which the case is replaced in position. The turret is then released by drawing up its locking pin and it is rotated and observation made through the finder and the camera properly leveled or adjusted to take in the desired portion of the landscape. The turret is then locked in its normal position by pushing down the pin. The diaphragm and the speed indicators are set and the shutter is unlocked by drawing up its locking pin and giving it a partial rotation to hold it in its elevated position. The desired stop is moved in and the bulb pressed to withdraw the stop lever and permit the turret to rotate and make an exposure.

In taking pictures in a vertical plane, as of buildings or mountain sides etc., the camera is supported with its axis horizontal to and parallel with the plane of the object to be photographed and the outer or exposure lens arranged to rotate in a vertical plane at right angles to the plane of said object. In such work it is evident that it is not necessary to have the lens make a full circle or rotation and the cycle stop can be set at substantially 90 degrees from the zenith or vertical. As the distortion produced by the lenses and the curvature of the film is very slight, owing to the narrow bar of light falling across or transversely of the length of the film, the pictures are very correct to nature and especially in taking vertical pictures where the side lines must be straight and parallel.

From the foregoing it will be seen that a full or partial circle exposure of any portion of a place or landscape can be made either upon a true or an inclined horizon, thereby rendering the camera of great value to the traveler or engineer and also to military officers, either for reference or as a range finder. It is also of value in architectural work or for taking groups or single portraits. And by means of the extra holders additional films may be easily and conveniently carried ready for use at any time. It is very compact and easily operated and by reason of its focal changes clear and distinct pictures can be obtained of any desired portion of the place or object being photographed.

Having described my invention I claim:—

1. In a panorama camera, means for holding the exposed film in the form of a cylinder, a traveling shutter mounted to rotate therein, an external lens, and means for making an exposure of any portion of up to and including a full circle.

2. In a panorama camera, means for holding the exposed film in the form of a cylinder, a traveling shutter mounted to rotate therein, an external lens connected with said shutter so as to rotate therewith, and means for making an exposure of any portion of up to and including a full circle.

3. In a panorama camera, means for holding the exposed film in the form of a cylinder, a traveling shutter mounted to rotate therein, an external lens connected with the shutter so as to rotate therewith, and independent means for varying the length of the travel of the shutter in making an exposure of less than a full circle.

4. In a panorama camera, means for holding the exposed film in the form of a cylinder, a traveling shutter mounted to rotate therein, an external lens connected with the shutter so as to rotate therewith, and a plurality of independently operable means for automatically stopping the shutter to vary the length of the picture, each of said means being provided with means for indicating the length of the picture in parts of a circle.

5. In a panorama camera, means for holding the exposed film in the form of a cylinder, a traveling shutter mounted to rotate therein, an external lens connected with the shutter so as to rotate therewith, a plurality of stops for engaging with the shutter and stopping its travel to vary the length of the picture.

6. In a panorama camera, a traveling shutter, radially movable stops for engaging with the shutter and stopping its travel to vary the length of the picture.

7. In a panorama camera, a traveling shutter, radially movable stops for engaging with the shutter and stopping its travel to vary the length of the picture, each stop being provided with characters to indicate the portion of a full circle the length of the picture will be.

8. In a panorama camera, a slotted case, a shutter rotatably mounted therein, blocks mounted in said slots and adapted to be moved into and out of the path of the shutter, and a pin in each block for moving it back and forth.

9. In a panorama camera, means for supporting and moving a film endwise therein, a traveling shutter, stops for engaging with the shutter and stopping its travel to vary the length of the picture, means for forming a notch in the upper edge of the film adjacent to the rear end of the picture, and means adapted to drop into said notch and indicate when the exposed portion of the film has been wound up.

10. In a panorama camera, means for supporting and moving a film endwise therein, a traveling shutter, blocks for engaging with the shutter and stopping its travel to vary the length of the picture, the inner ends of said blocks being each provided with means for forming a notch in the upper edge of the film, and means for engaging with said notched portion to indicate when the exposed portion of the film has been wound up.

11. In a panorama camera, a film flanged film guides, one of which is recessed, a traveling shutter, stops for engaging therewith to vary the length of the picture, a cutter on each stop adapted to fit the recess in the guide and form a notch in the film, and an indicator provided with means for engaging with said notched portion when the film is being wound up.

12. In a panorama camera, a film a traveling shutter, means for stopping the movement thereof, means for notching the edge of the film, and a plate provided with means for engaging with said notched portion and having one end formed into an indicator for extending above the top of the camera and indicating when the exposed portion of the film has been wound up.

13. In a panorama camera, a film a traveling shutter, means for stopping the movement thereof, means for notching the edge of the film, a plate secured at one end so as to extend across the top of the film and having its free end formed into a projection adapted to be extended above the top of the camera, and a roller journaled upon the underside of the plate in position for engaging with the film and entering said notch.

14. In a panorama camera, a substantially cylindrical film support, a focal plane shutter rotatably mounted in the axis thereof, means for automatically rotating the shutter, a series of characters for indicating the rate of speed at which the shutter will rotate, a pointer, and means for moving the pointer one step for each rotation of the shutter.

15. In a panorama camera, a substantially cylindrical film support, a focal plane shutter rotatably mounted in the axis thereof, a shutter carrier for rotating the shutter, a series of characters for indicating the rate of speed at which the shutter will rotate, a spur wheel mounted on the shutter carrier, a projection for engaging with said wheel and moving it one step at each revolution of the shutter, and a pointer connected with said wheel in position for registering with either one of said characters.

16. In a panorama camera, a substantially cylindrical film support, a shutter rotatably mounted in the axis thereof, means for automatically rotating the shutter and stopping it at the end of each revolution, means for indicating the rate of speed at which the shutter will rotate, and means for locking the shutter against rotation in either direction beyond a certain number of rotations.

17. In a panorama camera, a substantially cylindrical film support, a shutter rotatably mounted in the axis thereof, means for automatically rotating the shutter and stopping it at the end of each revolution, a star wheel for indicating the number of revolutions, one side of which wheel is smooth and shouldered, means for moving the wheel one step at each revolution of the shutter, and a pin for engaging with said shoulders to lock the shutter against rotation in either direction beyond a certain number of rotations.

18. In a panorama camera, a substantially cylindrical film support provided at its upper end with an inwardly extending projection, a recessed shutter carrier rotatably mounted in the axis of the film support, means for automatically rotating the shutter and stopping it at the end of each rotation, a series of characters around said recess for indicating the speed at which the shutter will rotate, a spur wheel mounted in said recess in position for engaging with said projection and having one side smooth and provided with shoulders, a pin for engaging with said shoulders, a pointer on the wheel adapted to be moved into register with said characters, and a protector for the pointer.

19. In a panorama camera, means projecting beyond the top of the camera for varying the focal distance.

20. In a panorama camera, a film means for holding the film in the form of a cylinder, means projecting beyond the top of the camera in the axis of said cylinder and provided with a lens, and means for varying the focal distance of the lens relative to the film.

21. In a panorama camera, a substantially cylindrical film support, a lens carrying member rotatably mounted in the axis thereof and extending beyond the top of the camera, a lens in said member, and means for moving said member longitudinally, and means for varying the focal distance of said lens relative to the film.

22. In a panorama camera, a substantially cylindrical film support, a turret rotatably mounted in the axis thereof, a lens carrying member in the turret, a lens in said member, and means for moving said member longitudinally for varying the focal distance of the lens relative to the film.

23. In a panorama camera, a substantially cylindrical film support, a turret rotatably mounted in the axis thereof and provided with a lens, and adjustable means for moving said lens longitudinally of the axis of the turret to vary the focus.

24. In a panorama camera, a substantially cylindrical film support, a turret rotatably mounted on the axis thereof and provided with a lens carrying member, inner and outer lenses in said member at right angles to each other, two reflectors located on opposite sides of the inner lens, and means for moving said member to vary the focus.

25. In a panorama camera, a substantially cylindrical film support, a turret rotatably mounted in the axis thereof and provided with a lens carrying member, lenses mounted at right angles and in fixed relation to each other in said member, a reflector between and at an angle to said lenses, a reflector in the turret, and means for moving said member relative to said last mentioned reflector to vary the focus.

26. In a panorama camera, a substantially cylindrical film support, a turret rotatably mounted in the axis thereof and provided with a lens carrying member and a reflector, two lenses mounted at right angles to each other in said member, the mechanical center of one of which is in said axis extended, a reflector between said lenses, and means for moving said member relative to the reflector in the turret to vary the focus.

27. In a panorama camera, a substantially cylindrical film support, a lens rotatably mounted at one end of the camera with its mechanical center in the extended axis of said cylinder, means for moving the lens longitudinally of said axis, and adjustable means at one side of said axis for reflecting the light from said lens to cause it to fall upon the film, and a focal indicator.

28. In a panorama camera, a substantially cylindrical support, a lens rotatably mounted at one end of the camera with its mechanical center in the extended axis of said cylinder, means for moving the lens longitudinally of said axis, two prisms and a lens at one side of the axis for reflecting the light from said lens to cause it to fall upon the film, and means for adjusting said lens and prisms relative to each other to vary the focus, and a focal indicator.

29. In a panorama camera, a substantially cylindrical film support, a turret rotatably mounted therein and provided with a narrow fan shaped light shaft and an opening, a reflector at the junction of the shaft and the opening, a frame rotatably mounted in the opening and provided with a light well and with lenses and a reflector, a nut for moving said frame longitudinally, and a focal indicator.

30. In a panorama camera, a substantially cylindrical film support, a turret rotatably mounted therein and provided with a narrow fan shaped recess in one side and a cylindrical opening communicating therewith, a reflector at the junction of the recess and the opening, a tube in the opening provided with a pin, a nut in the tube with a flange on its outer end to rest upon the tube and having a groove near its inner end for said pin, a screw threaded frame in the nut provided with a light well and with lenses and a reflector in fixed relation to each other but movable relative to the other reflector, and a focal distance indicator.

31. In a panorama camera, a film support, a turret rotatably mounted therein, a reflector, a longitudinally movable member in the turret provided with a graduated leg, lenses and a reflector in said member, and means for moving the member longitudinally.

32. In a panorama camera, a film support, a turret rotatably mounted therein, reflectors carried by said turret, an object lens carried by the turret, and a finder lens carried by the turret on the side opposite to the said object lens and having its axis coaxial with the axis of said object lens, substantially as described.

33. In a panorama camera, a film support, a turret rotatably mounted therein, a reflector and a longitudinally movable frame in the turret, the outer end of the frame being provided with a lens and a reflector, a view finder to the rear of the reflector having an opening in its top and a lens in the side opposite said other lens, a hood over said opening, and means for moving the frame longitudinally.

34. In a panorama camera, a film support, a turret rotatably mounted therein, an adjustable frame in the turret provided with a lens, a diaphragm, and means on the exterior of the frame for adjusting the diaphragm.

35. In a panorama camera, a film support, a turret rotatably mounted therein provided with a laterally opening light shaft, a shutter adapted to open and close said shaft, means for normally holding the shutter open, and means for automatically closing and locking the shutter at the end of an exposure.

36. In a panorama camera, a film support, a turret rotatably mounted therein provided with a light shaft, a plate pivotally secured to the side of the turret and adapted to be moved laterally to open and close said shaft, a spring for normally holding the plate so as to open the shaft, means for automatically closing the shaft at the end of an exposure, and means for locking the plate closed.

37. In a panorama camera, a film support, a turret rotatably mounted therein and provided with a light shaft, a laterally movable plate for closing said shaft provided with a projection, means for normally holding the plate so as to open the shaft, an adjustable stop for engaging with said projection and automatically closing the shaft, and means for automatically locking the plate closed.

38. In a panorama camera, a film support, a turret rotatably mounted therein, and provided with a light shaft, a base plate on the turret provided with a perforation and a shoulder adjacent thereto, an arm pivotally secured to the base plate and provided with a plate at substantially right angles thereto for closing the shaft, a spring for normally holding the plate so as to open the shaft, a longitudinally movable pin mounted in said perforation with its end adapted to engage with the plate and lock it closed, a pin in said pin for engaging with the shoulder, and means for automatically releasing the second mentioned pin from said shoulder.

39. In a panorama camera, a film support, a turret rotatably mounted therein and provided with a light shaft, a base plate on the turret provided with a perforation and a shoulder adjacent thereto, an arm pivotally secured to the base plate, a plate at the free end of the arm provided with a projection and a notch, a spring for normally holding the plate so as to open the shaft, a longitudinally movable pin in said perforation and provided with two pins, one of which is adapted to engage with said shoulder and the other one to pass through said notch, a spring on the longitudinally movable pin, and means for automatically closing said plate and releasing the spring pressed pin to permit its end to engage with said projection and lock the shutter closed.

40. In a panorama camera, a film support, a turret rotatably mounted therein and provided with a light shaft, a shutter for said shaft, two pins through the turret, each of which has a head for operating it, one of the pins being adapted for controlling the movements of the turret and the other one those of the shutter.

41. In a panorama camera, a film support, a turret rotatably mounted therein and provided with a light shaft, a perforated member, a shutter for said shaft, two longitudinally movable pins through the turret, one of which engages with said member to lock the turret against rotation, and the other of which controls the shutter and is spring pressed and rotatable and has its head slotted and located under the head of the first-named pin.

42. In a panorama camera, a substantially cylindrical film support, a film carried thereby, a turret rotatably mounted therein and provided with a light shaft, means for locking it against rotation, a shutter for closing the shaft, and a focal plate on the shutter adapted to be moved into and out of the plane of the film.

43. In a panorama camera, a film support, a film carried thereby a turret rotatably mounted therein and provided with a light shaft, means for locking the turret against rotation, a shutter for closing the shaft comprising a pivotally mounted plate, an arm pivotally secured to said plate, and a focal plate secured to the arm in position to be moved into the plane of the film or be folded against the shutter.

44. In a panorama camera, a base, a cylindrical film support thereon, a focal plane shutter rotatably mounted on the base, a motor for automatically rotating the shutter to make a full circle exposure, and a plurality of stops for causing the shutter to make any part of a circle.

45. In a panorama camera, a base, a cylindrical film support thereon, a casing on the base having perforations in its top, a rotary post projecting through the casing, a focal plane shutter removably secured to the post, and a pin on the shutter, the lower end of which is adapted to enter any one of said perforations and lock the shutter against rotation.

46. In a panorama camera, a base, a cylindrical film support thereon, the top of which is in the form of a ring, a turret mounted within the support and provided with a light shaft, a shutter for the shaft provided with an arm, and a series of radially arranged blocks mounted on the under side of said ring and adapted to be moved into the path of said arm.

47. In a panorama camera, a base, a cylindrical film support thereon, the top of which is in the form of a ring, a turret rotatably mounted within said support and provided with a light shaft, a shutter for the shaft provided with a projection, a stop lever pivotally mounted on said ring with its inner end movable into and out of the path of said projection, and means for moving said lever to release the shutter.

48. In a panorama camera, a cylindrical film support, the top of which is provided with a ring, a focal plane shutter rotatably mounted within said support, a stop lever pivotally secured to said ring for controlling the rotation of the shutter, a plate, means for operating said plate, and a pawl on the plate in position for actuating and then releasing the lever.

49. In a panorama camera, a cylindrical film support, the top of which is provided with a ring, a focal plane shutter rotatably mounted within said support, a plate on the under side of said ring, a stop lever pivotally secured to the plate, a post through the plate and the ring, an arm on the upper end of the post adapted to be actuated by the plunger, a second plate on the lower end provided with a pawl for actuating the stop lever, and pins for holding the lever, the second plate and pawl in their normal position, one pin engaging with said second plate and lever.

50. In a panorama camera, a base, a cylindrical film support thereon comprising two rings and uprights therebetween, two film holders, a film two rollers between said holders, means for notching the top of the film, a plate secured to the top at one end between one of the film holders and said rollers and having its free end provided with an indicator, a roller on the under side of said plate for engaging with the notched portion of the film, and a focal plane shutter rotatably mounted within said film support.

51. In a panorama camera, a base, a cylindrical film support thereon comprising two rings and supports therebetween, a flanged film guide on each ring, the one at the bottom being provided with lips spaced apart to form finger holds, and the one at the top being recessed and provided with a projection, cutters for said recesses, a time indicator adapted to be operated by the projection, and means for making an exposure.

52. In a panorama camera, a base, a cylindrical film support and a casing thereon, the casing having open ended inclined slots, pins through said slots into the support, part of said pins projecting through the support into the base, and means for making an exposure.

53. In a panorama camera, a base, a cylindrical film support and a casing thereon, the casing having open ended inclined slots, the inner end of part of the slots being enlarged, pins through said slots, part of which pins pass through the support and are adapted to engage with the base and the others are each provided with an enlargement which enlargement is adapted to fit in said enlarged portions of the slots, means for preventing the entire removal of said pins, and means for making an exposure.

54. In a panorama camera, a two part circular base, a supporting socket between said parts, a cylindrical film support on the base, a casing on the base provided with a post located in the axis of the support, a turret detachably mounted on said post provided with means for making an exposure, and means within the casing for rotating the post and turret.

55. In a panorama camera, a base, a cylindrical film support and a casing removably secured thereon, a turret rotatably mounted on the base, a plate on the turret, and an annular disk upon said plate and overhanging the film support.

56. In a panorama camera, a base, a cylindrical film support provided with two rollers and an indicator, means for moving the film over said rollers and around the support, a focal plane shutter rotatably mounted on the base, means for automatically stopping the shutter opposite said rollers, and an annular disk on the shutter overhanging the film support and provided with an indicator to register with the register on the support when the opening of said shutter is opposite said rollers.

57. In a panorama camera, a cylindrical base, a cylindrical case secured thereto, a socket in the base and another one in the side of the casing for supporting the camera in a vertical or horizontal position, a level in the top and another in the side of the casing opposite the socket in the side, and a rotary focal plane shutter adapted to make an exposure when the camera is in either position.

In testimony whereof I affix my signature, in presence of two witnesses, this 29th day of August 1905.

WILLIAM A. CASE.

Witnesses:
M. R. SEELY,
W. S. BOYD.